United States Patent
Sturm et al.

(10) Patent No.: US 11,650,312 B2
(45) Date of Patent: May 16, 2023

(54) METHOD FOR DETERMINING AT LEAST ONE OBJECT INFORMATION ITEM OF AT LEAST ONE TARGET OBJECT WHICH IS SENSED WITH A RADAR SYSTEM, IN PARTICULAR OF A VEHICLE, RADAR SYSTEM AND DRIVER ASSISTANCE SYSTEM

(71) Applicant: Valeo Schalter und Sensoren GmbH, Bietigheim-Bissingen (DE)

(72) Inventors: Christian Sturm, Bietigheim-Bissingen (DE); Hamid Afrasiabi Vayghan, Bietigheim-Bissingen (DE); Yoke Leen Sit, Bietigheim-Bissingen (DE); Urs Lübbert, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 316 days.

(21) Appl. No.: 16/767,759

(22) PCT Filed: Dec. 3, 2018

(86) PCT No.: PCT/EP2018/083307
§ 371 (c)(1),
(2) Date: May 28, 2020

(87) PCT Pub. No.: WO2019/110487
PCT Pub. Date: Jun. 13, 2019

(65) Prior Publication Data
US 2021/0003701 A1    Jan. 7, 2021

(30) Foreign Application Priority Data
Dec. 7, 2017  (DE) .................... 10 2017 129 149.0

(51) Int. Cl.
*G01S 13/931*    (2020.01)
*G01S 13/58*    (2006.01)

(52) U.S. Cl.
CPC .......... *G01S 13/931* (2013.01); *G01S 13/583* (2013.01); *G01S 2013/9315* (2020.01)

(58) Field of Classification Search
CPC ................ G01S 13/931; G01S 13/583; G01S 2013/9315; G01S 7/356;
(Continued)

(56) References Cited

U.S. PATENT DOCUMENTS

2011/0080314 A1*  4/2011  Wintermantel ...... H01Q 9/0407
342/147

FOREIGN PATENT DOCUMENTS

DE    102009032115 A1    1/2010
EP       2417475 B1    8/2013
(Continued)

OTHER PUBLICATIONS

International Search Report and Written Opinion in corresponding International Application No. PCT/EP2018/083307, dated Feb. 5, 2019 (12 pages).
(Continued)

*Primary Examiner* — Timothy X Pham
(74) *Attorney, Agent, or Firm* — Osha Bergman Watanabe & Burton LLP (57) ABSTRACT

A method for determining at least one object information item of at least one target object (18) which is sensed with a radar system (12), in particular of a vehicle (10), a radar system (12) and a driver assistance system (20) are described. In the method, transmission signals (32a, 32b) are transmitted into a monitoring range (14) of the radar system (12) with at least one transmitter (26a, 26b). Echoes, which
(Continued)

are reflected at the at least one target object (18), of the transmission signals (32*a*, 32*b*) are received as received signals (34*a*, 34*b*) with at least one receiver (30), and if necessary are converted into a form which can be used by an electronic control and/or evaluation device (28). The received signals (34*a*, 34*b*) are subjected to at least one multi-dimensional discrete Fourier transformation. At least one target signal is determined from the result of the at least one Fourier transformation. At least one object information item is determined from the at least one target signal. At the transmitter end, at least one first transmission signal (32*a*) and at least one second transmission signal (32*b*) are generated from a frequency-modulated continuous wave signal. The at least one second transmission signal (32*b*) is encoded by means of phase modulation with respect to the at least one first transmission signal (32*a*), with the result that an at least temporary signal orthogonality between the at least one first transmission signal (32*a*) and the at least one second transmission signal (32*b*) is obtained. The at least one first transmission signal (32*a*) is emitted with at least one first transmitter (26*a*), and the at least one second transmission signal (32*b*) is emitted with at least one second transmitter (26*b*), simultaneously into the monitoring range (14) of the radar system (12). The at least one second transmission signal (32*b*) is emitted with regular transmission pauses of a predefined length.

13 Claims, 4 Drawing Sheets

(58) Field of Classification Search
CPC .... G01S 2013/93271; G01S 7/35; G01S 7/41; G01S 13/00; G01S 13/003; G01S 13/32; G01S 13/325; G01S 13/34; G01S 13/343; G01S 13/48; G01S 13/532; G01S 13/87; G01S 13/878; G01S 13/93; G01S 7/354
See application file for complete search history.

(56) References Cited

FOREIGN PATENT DOCUMENTS

| | | |
|---|---|---|
| EP | 2629113 A1 | 8/2013 |
| EP | 2876460 A1 | 5/2015 |
| WO | 2018130324 A1 | 7/2018 |
| WO | 2018137835 A1 | 8/2018 |
| WO | 2018137836 A1 | 8/2018 |

OTHER PUBLICATIONS

German Search Report in corresponding German Application No. 10 2017 129 149.0, dated Aug. 17, 2018 (8 pages).

* cited by examiner

$$(a_{k,lt_r}) = \begin{pmatrix} a_{0,0} & \cdots & a_{256,0} \\ \cdots & & \cdots \\ a_{0,32} & \cdots & a_{256,32} \end{pmatrix}$$

with groupings: $ZS1_{TX22}$, $ZS1_{TX1}$, $ZS1_{TX21}$ $$a_{96,0} = (\ |s_0(96,0)| + |s_1(96,32)| + |s_2(96,64)| + |s_3(96,96)|\ )^2$$

with groupings: $ZS2_{TX1}$, $ZS2_{TX21}$, $ZS2_{TX22}$ $$a_{192,0} = (\ |s_0(192,0)| + |s_1(192,32)| + |s_2(192,64)| + |s_3(192,96)|\ )^2$$

$$a_{192,16} = (\ |s_0(192,16)| + |s_1(192,48)| + |s_2(192,80)| + |s_3(192,112)|\ )^2$$

with groupings: $ZS3_{TX22}$, $ZS3_{TX1}$, $ZS3_{TX21}$

Fig. 8

$$(a_{k,lt_r}) = \begin{pmatrix} a_{0,0} & \cdots & a_{32,0} & a_{96,0} & \cdots & a_{192,0} & \cdots & a_{256,0} \\ \cdots & & & & & & & \cdots \\ \cdots & & & & & a_{192,16} & & \\ \cdots & & & & & & & \cdots \\ a_{0,32} & & & & \cdots & & & a_{256,32} \end{pmatrix}$$

Fig. 9

METHOD FOR DETERMINING AT LEAST ONE OBJECT INFORMATION ITEM OF AT LEAST ONE TARGET OBJECT WHICH IS SENSED WITH A RADAR SYSTEM, IN PARTICULAR OF A VEHICLE, RADAR SYSTEM AND DRIVER ASSISTANCE SYSTEM

TECHNICAL FIELD

The invention relates to a method for determining at least one object information item of at least one target object which is sensed with a radar system, in particular of a vehicle, in which
- transmission signals are transmitted into a monitoring range of the radar system with at least one transmitter,
- echoes, which are reflected at the at least one target object, of the transmission signals are received as received signals with at least one receiver, and if necessary are converted into a form which can be used by an electronic control and/or evaluation device,
- the received signals are subjected to at least one multi-dimensional discrete Fourier transformation,
- at least one target signal is determined from the result of the at least one Fourier transformation.
- at least one object information item is determined from the at least one target signal.

In addition, the invention relates to a radar system, in particular of a vehicle, for determining at least one object information item of at least one target object,
- having at least one transmitter for transmitting transmission signals into a monitoring range,
- having at least one receiver for receiving echoes, which are reflected at the at least one target object, of the transmission signals as received signals and
- having at least one control and/or evaluation device,
- wherein the at least one control and/or evaluation device has means for determining at least one target signal from at least one multi-dimensional discrete Fourier transformation of the received signals and for determining at least one object information item from at least one target signal.

Furthermore, the invention relates to a driver assistance system of a vehicle, having
- at least one electronic control device for controlling functional devices of the vehicle on the basis of object information which is made available by at least one radar system, and
- at least one radar system for determining at least one object information item of at least one target object, wherein the at least one radar system has
- at least one transmitter for transmitting transmission signals into a monitoring range,
- at least one receiver for receiving echoes, which are reflected at the at least one target object, of the transmission signals as received signals and
- at least one control and/or evaluation device,
- wherein the at least one control and/or evaluation device has means for determining at least one target signal from at least one multi-dimensional discrete Fourier transformation of the received signals and for determining at least one object information item from at least one target signal.

PRIOR ART

Document EP 2 417 475 B1 discloses a radar system for use for driver assistance systems in motor vehicles. The radar system has a transmission antenna for irradiating transmission signals and a multiplicity of, in particular, reception antennas for simultaneously receiving transmission signals reflected at objects. So that the distance from objects can be measured, a frequency of a high-frequency oscillator, and therefore of the transmission signals, is changed very quickly in a linear fashion; the term frequency ramp is used here. The frequency ramps are repeated periodically; overall in a numerical example there are 1024 frequency ramps. During a frequency ramp, the received signals in all the reception channels are sampled at an ND converter, e.g. 512 times, in each case at an interval of e.g. 25 ns. Then, a discrete Fourier transformation (DFT) in the form of fast Fourier transformation (FFT) is formed over the e.g. 512 sampled values of each frequency ramp and of each reception channel. As result, objects at different distances, which give rise to different frequencies, can be separated. Each of the discrete Fourier support points j of the DFT corresponds to a distance r and can therefore also be referred to as a range gate, in a way analogous with pulse radars. A plurality of objects with different relative speeds in the same range gate are separated by virtue of the fact that a second DFT is calculated for each reception channel and each range gate by means of the complex spectrum values which occur in the e.g. 1024 frequency ramps. Each discrete support point l of this second DFT corresponds to a set of Doppler frequencies. With the exemplary configurations under consideration, from the set of possible relative speeds there is always just one appropriate or possible relative speed for the road traffic.

The invention is based on the object of configuring a method, a radar system and a driver assistance system of the type mentioned beginning in which any ambiguities with respect to object information, in particular distance, speed and/or direction of the at least one object relative to the radar system, can be resolved more simply and/or more reliably.

DISCLOSURE OF THE INVENTION

This object is achieved with the method according to the invention in that
- at the transmitter end, at least one first transmission signal and at least one second transmission signal are generated from a frequency-modulated continuous wave signal, wherein the at least one second transmission signal is encoded by means of phase modulation with respect to the at least one first transmission signal, with the result that an at least temporary signal orthogonality between the at least one first transmission signal and at least one second transmission signal is obtained,
- the at least one first transmission signal is emitted with at least one first transmitter, and the at least one second transmission signal is emitted with at least one second transmitter, simultaneously into the monitoring range of the radar system, wherein the at least one second transmission signal is emitted with regular transmission pauses of a predefined length.

According to the invention, the at least one first transmission signal and the at least one second transmission signal are not continuously emitted simultaneously. In the case of the at least one second transmission signal, regular transmission pauses of a predefined length are inserted. Furthermore, the at least one first transmission signal and the at least one second transmission signal are emitted at different phase positions. Overall this ensures that the result of the at least one discrete Fourier transformation does not have any ambiguities. The target signals of at least one target object can be assigned to the transmission signals and therefore validated.

The at least one first transmitter and the at least one second transmitter are active at the same time. In this way, the determination of the object information can be speeded up.

The reflected echoes are received at the receiver end as received signals and, where necessary, are converted into a form which can be used by an electronic control and/or evaluation device. If the transmission signals and the resulting echoes have a type of signal which cannot be processed directly with the corresponding electronic control and/or evaluation device, the received signals are converted into an electronically usable form. Otherwise, there is no need for corresponding adaptation, in particular conversion, of the received signals. In this way, the received signals can be processed by means of the electronic control and/or evaluation device either directly or, if appropriate, after corresponding adaptation.

The method can advantageously be implemented with at least one means using software and/or hardware solutions. The method can be implemented by means of software and/or hardware solutions in combination with the control and/or evaluation device. The means for executing the method can be contained in a control and/or evaluation device of the radar system which is required in any case.

The radar system can advantageously use fast frequency modulation for implementing the transmission signals. In this context, a plurality of what are referred to as chirps with corresponding frequency ramps as chirps sequences are emitted in succession.

The at least one second transmission signal is encoded by means of phase modulation with respect to the at least one first transmission signal, with the result that an at least temporary signal orthogonality between the at least one first transmission signal and the at least one second transmission signal is obtained. In this way, differentiation of the at least one first transmission signal from the at least one second transmission signal at the receiver end can be simplified.

At the output of the Fourier transformation, the target signals which originate from the individual transmission signals are shifted in the Doppler dimension in accordance with the phase difference which is added from one chirp to the next. By using the method according to the invention, the individual signal components can be unambiguously assigned to the at least one first transmission signal and the at least one second transmission signal, and the phase position of the individual propagation paths can be determined independently of one another.

In one advantageous embodiment, a multiplicity of target signals can be determined at the receiver end from the result of the at least one multi-dimensional discrete Fourier transformation. In this context, one of the target signals for each physically present target object can correspond to the at least one first transmission signal, and two target signals can correspond to the at least one second transmission signal. Since the intensity of the at least one second transmission signal is divided between two target signals, the amplitudes of the target signals from the at least one second transmission signal are smaller than the amplitude of the target signal from the first transmission signal, provided that the first transmission signal and the second transmission signal are emitted with the same intensities. In this way, the two target signals from the at least one second transmission signal can be differentiated from the target signal from the at least one first transmission signal.

In a further advantageous embodiment, the result of the at least one multi-dimensional Fourier transformation can be prevented as a range Doppler matrix for a uniqueness range with respect to a Doppler dimension. In this context, the range Doppler matrix can be composed of cells which can each be characterized by a Doppler value and a range value and can have a complex-valued amplitude which can characterize a signal intensity. The range Doppler matrix can be divided into four sub-matrices with the same extent with respect to the Doppler dimension, For each range value the absolute values of the amplitudes of the cells of the sub-matrices which each correspond in priority with respect to their Doppler value are combined to form a respective spectrum value. From the spectrum values, those values can be determined which are above a predefined threshold and are detected as target spectrum values which are associated with a respective target signal.

The dimension of a cell in the range Doppler matrix in the distance dimension is referred to as a range gate. The dimension of a cell in the Doppler dimension is referred to as a Doppler gate. Each range gate is characterized by a range value and each Doppler gate is characterized by a Doppler value. Therefore, each cell in the range Doppler matrix is characterized by a range value and a Doppler value.

The number of sub-matrices can advantageously be calculated from the quotient of the number of Doppler gates of the uniqueness range and the smallest Doppler interval between target signals originating from the at least one first transmission signal and the at least one second transmission signal, of the same target object. In the case of a uniqueness range of, in particular, 128 Doppler gates and a smallest Doppler interval of, in particular, 32 Doppler gates, the range Doppler matrix can be divided into four sub-matrices, each with an extent of 32 Doppler gates. The uniqueness range can also comprise more or fewer than 128 Doppler gates. The smallest Doppler intervals between the target signals can be predefined by corresponding selection of the phase modulation and/or of the transmission pauses at the transmitter end.

In a further advantageous embodiment, for at least one target spectrum value a difference can be formed between the complex-valued amplitudes of the cells which are associated with this target spectrum value and which have the lowest Doppler value and the third-lowest Doppler value, and the absolute value of this difference can be squared and assigned to a first comparison value. A difference between the complex-valued amplitudes of the cells which are associated with this target spectrum value and have the second-lowest Doppler value and the highest Doppler value can be formed, and the absolute value of this difference can be squared and assigned to a second comparison value. The comparison values can be compared and the signals which are associated with the cells from whose amplitudes the lower of the two comparison values is formed can be validated as the two target signals which originate from the at least one second transmission signal, for the same target object. The absolute values of the amplitudes of the cells which are not used to form the lowest comparison value can be compared, and the signal which is associated with the cell with the largest amplitude in absolute terms can be validated for the same target object as the target signal which originates from the at least one first transmission signal.

For each range value the absolute values of the amplitudes of the cells of the sub-matrices which each correspond in priority with respect to their Doppler value are combined to form a respective spectrum value. In total, four absolute values—one absolute value for each of the sub-matrices—which are equal in priority with respect to their Doppler value, are added. For example, the cells are equal in priority with respect to their Doppler value which have the lowest Doppler value in their respective sub-matrix. Correspondingly, the cells which have the second lowest Doppler value in their respective sub-matrix are equal in priority.

In order to determine the spectrum values, the absolute values of the amplitudes of the respective cells can advantageously be added and the result squared. Alternatively, the absolute values of the amplitudes can be squared (absolute value squares) and the absolute value squares of the amplitudes can be added. In this way, by combining the corresponding cells of the sub-matrices an overall amplitude of the cells which correspond to one another and have the same range value can be determined.

From the spectrum values, those which lie above a predefined noise threshold with respect to their power are determined. These spectrum values are detected as target spectrum values which are associated with a respective target signal. In this way, the actual target signals can be differentiated from noise and/or ghost signals. The cells of the range Doppler matrix which contain target signals can therefore be determined.

For at least one target spectrum value, a difference between the complex-valued amplitudes of the cells which are associated with this target spectrum value and which have the lowest Doppler value and the third-lowest Doppler value is formed, and the absolute value of this difference is squared and assigned to a first comparison value. Furthermore, a difference is formed between the complex-valued amplitudes of the cells which are associated with this target spectrum value and have the second-lowest Doppler value and the highest Doppler value, and the absolute value of this difference is squared and assigned to a first comparison value. The comparison values are compared. The signals which are associated with the cells from whose complex-valued amplitudes the lower of the two comparison values is formed are validated as the two target signals which originate from the at least one second transmission signal, for the same target object. The absolute values of the amplitudes of the cells which are not used to form the lowest comparison value are compared. The signal which is associated with the cell with the amplitude which is the largest in absolute value is validated for the same target object as the target signal which originates from the at least one first transmission signal. The cells which actually contain target signals can be efficiently and quickly identified by comparing the comparison values.

In a further advantageous embodiment, at least one object information item can be determined from at least one validated target signal. In this context, both the at least one first transmission signal and the at least one second transmission signal, and correspondingly the target signals, can be used to determine object information. In this way, different object information can be determined more directly and any ambiguities can be resolved more reliably.

At least one object information item in the form of a speed/or position, in particular an interval and/or a direction, of the at least one object relative to the radar system can be advantageously determined from at least one validated target signal. In this way, the radar system can be used to acquire information about the at least one object, which information is interesting in particular to control driving functions of the vehicle.

The target objects which can be sensed with the radar system can be stationary or moving objects, in particular other vehicles, persons, obstacles, uneven portions of the roadway, in particular potholes or stones, roadway boundaries or the like. A plurality of target objects can originate from different parts of one and the same object or different objects.

The invention can be used in a vehicle, in particular a motor vehicle. The invention can advantageously be used in a land-based vehicle, in particular a passenger vehicle, a lorry, a bus, a motorcycle or the like, an aircraft land/or a watercraft. The invention can also be used in autonomous, or at least partially autonomous, vehicles.

The radar system can advantageously be connected to a driver assistance system of the vehicle, in particular a parking assistance system, a chassis control system and/or a driver information device, or be part of such a system or device. In this way, the object information acquired with the radar system, in particular distances, directions and/or speeds of an object relative to the vehicle can be transmitted to a controller of the driver assistance system and used to influence driving functions, in particular the speed, a braking function, a steering function and/or the outputting of a message signal and/or warning signal, in particular for the driver.

In one advantageous refinement of the method, the target spectrum values can be determined from the spectrum values by means of at least one detection algorithm. In this way, signals which are associated with target spectrum values can be differentiated from signals which originate from noise or ghost signals. An algorithm for determining a constant false alarm rate (CFAR) can advantageously be used as a detection algorithm.

In one advantageous refinement, the length of the transmission pauses of the at least one second transmission signal can be predefined as a period length or integral multiple of the period length of the at least one first transmission signal. In this way, the at least one second transmission signal can be divided into two target signals at the receiver end by means of the Fourier transformation. The interval between these two target signals in the Doppler dimension can correspond to half the number of the Doppler gates in the uniqueness range.

The at least one first transmission signal and the at least one second transmission signal can advantageously each be emitted as a chirp with the same duration. The at least one second transmission signal can pause for the duration of one chirp at every second chirp. The period length of the corresponding transmission signal can correspond to the duration of one chirp In a further advantageous refinement of the method, a phase difference between at least two validated targets signals can be determined. An angle of incidence or directional angle can be determined as an object information item from the phase difference. The direction of the sensed target object relative to the radar system can therefore be determined.

In a further advantageous refinement of the method, at least one multi-dimensional discrete Fourier transformation can be executed as a fast Fourier transformation in the course of the determination of at least one object information item. In this way, the at least one Fourier transformation can be calculated more quickly.

A single multi-dimensional, in particular two-dimensional, three-dimensional, four-dimensional or the like, discrete Fourier transformation can advantageously be executed. In this way, information both from the at least one first transmission signal and from the at least one second transmission signal can be utilized with just a single, in particular fast, Fourier transformation. The method can therefore be executed more efficiently.

A two-dimensional Fourier transformation can advantageously be carried out at a receiver. When there are more than two receivers, a higher-dimensional, in particular three-dimensional, Fourier transformation can be carried out.

The at least one second transmission signal can advantageously be encoded at the transmitter end by means of binary shift keying. In this way, a signal orthogonality between the at least one first transmission signal and the at least one second transmission signal can be brought about. The binary shift keying is a digital modulation method known per se and is also referred to in specialist circles as "binary phase-shift keying" (BPSK).

The encoding of at least one transmission signal can be advantageously carried out in time with the frequency ramps of the chirp sequences. In this way, the linear frequency ramps which follow one another can optionally be emitted with different phase positions, in particular 0° or 180°. The phases can therefore be shifted in such a way that the transmission signals at the at least one first transmitter and that the at least one second transmitter are orthogonal when considered over the entire sequence length.

In a further advantageous refinement of the method, a regularly alternating pattern can be applied to at least transmission signal. In this way, the at least one transmission signal, in particular at least one second transmission signal, can be differentiated from another transmission signal, in particular at least one first transmission signal, and more easily separated at the receiver end. At least one transmission signal can advantageously be emitted in the form of chirps.

In a further advantageous refinement of the method, at least one transmission signal can be emitted with a constant phase and/or at least one transmission signal can be emitted with an alternating phase. In this way, the at least one first transmission signal can be differentiated better from the at least one second transmission signal.

At least one first transmission signal can advantageously be emitted with a constant phase, and at least one second transmission signal can advantageously be emitted with an alternating phase. Alternatively, at least one first transmission signal can advantageously be emitted with an alternating phase, and at least one second transmission signal can advantageously be emitted with a constant phase.

The transmission signal which is emitted with a constant phase can serve, after corresponding evaluation at the receiver end, as a reference with respect to at least one object information item, without the phase shift having to be corrected. Therefore, a relative speed between the sensed target object and the radar system can be directly determined, in particular from this transmission signal.

In a further advantageous embodiment, a phase change between 0° and 180° can be applied to at least one transmission signal after each frequency ramp of the frequency-modulated continuous wave signal. In this way, a regularly alternating pattern can easily be applied to the at least one transmission signal. Alternatively, a phase change between 0° and 180° can be applied to at least one transmission signal after each frequency ramp and a subsequent signal pause. In this way, ambiguity can be avoided.

The method can advantageously be carried out repeatedly in succession, in particular cyclically. In this way, the monitoring range can be monitored over a relatively long time period. Additionally or alternatively, the results of the individual measuring cycles can be compared with one another and therefore validation of the target signals can be improved and ambiguities resolved better.

At least one target signal can be advantageously validated over a plurality of measuring cycles. Such a method can be referred to as "tracking". By observing changes in at least one object information item, in particular a distance of the target object, over a plurality of measuring cycles, it is possible to determine which object information items of a plurality of other object information items, in particular speeds which can be determined from target signals, are correct. In this context, it is possible to additionally make use of the fact that of two object information items, in particular two different speeds which are determined for a target signal, only one object information item, that is to say a speed, can be correct. Overall, ambiguities with respect to target signals and object information contained therein can therefore be resolved more reliably.

In addition, according to the invention the technical objective is solved in the radar system by virtue of the fact that the at least one control and/or evaluation unit has means for carrying out the inventive method.

The means for carrying out the inventive method can advantageously be implemented by means of software and/or hardware solutions.

Furthermore, according to the invention the technical objective is solved in the driver assistance system by virtue of the fact that that the at least one control and/or evaluation unit has means for carrying out the inventive method.

Moreover, the features and advantages indicated in connection with the method according to the invention, the radar system according to the invention and the driver assistance system according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which an exemplary embodiment of the invention will be explained in more detail with reference to the drawing. A person skilled in the art will also expediently consider individually the features which have been disclosed in the drawing, the description and the claims in combination and combine them to form further meaningful combinations. In the drawing:

In the figures, identical structural elements are provided with the same reference numerals.

EMBODIMENT(S) OF THE INVENTION

Figure 1:
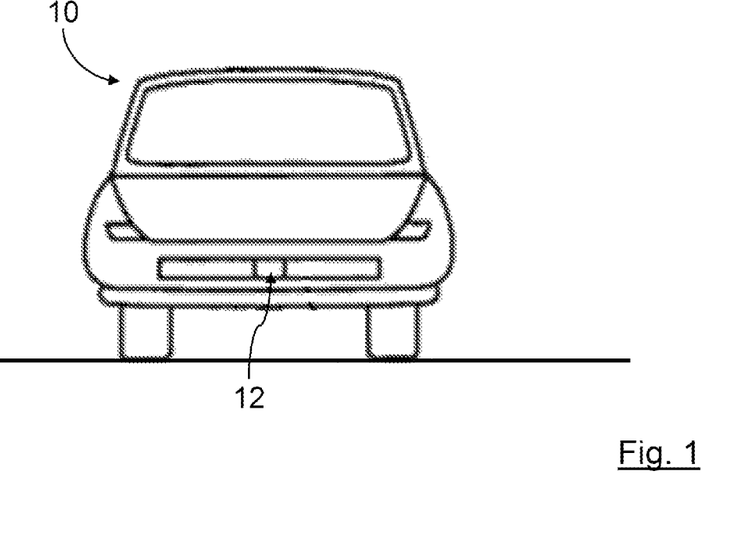
FIG. 1 shows a motor vehicle with a driver assistance system and a radar system for monitoring a monitoring range ahead of the motor vehicle in the direction of travel.
Figure 2:
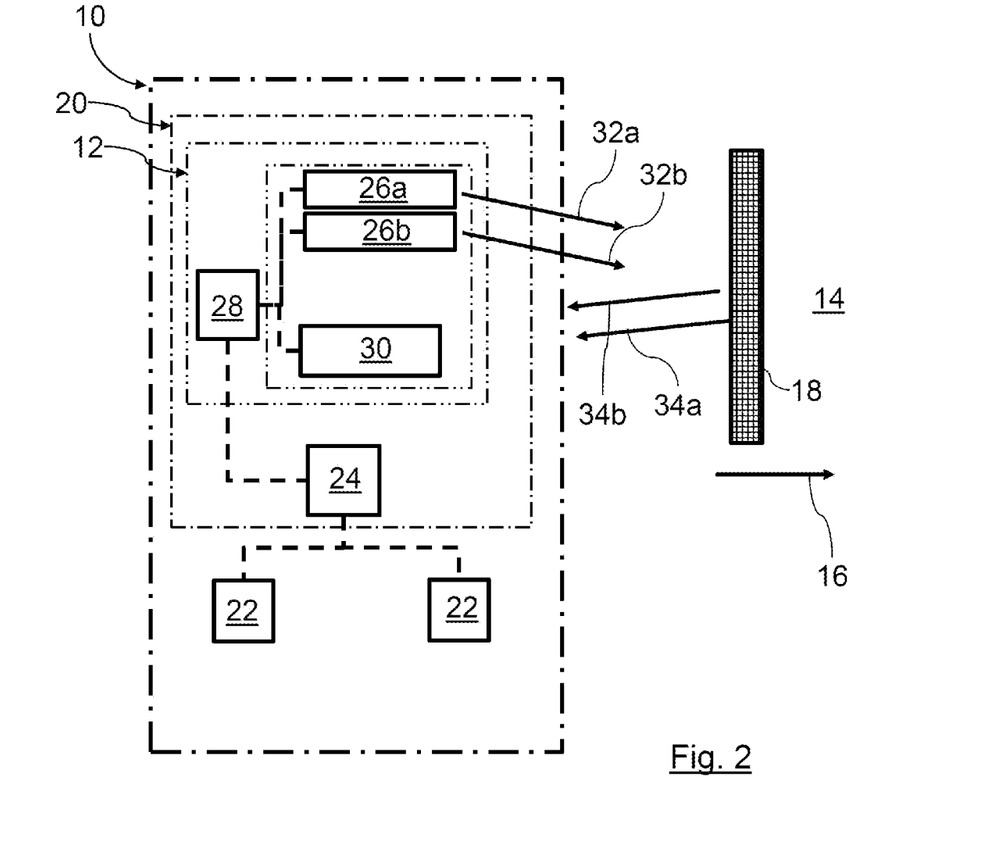
FIG. 2 shows a functional illustration of the motor vehicle with the driver assistance system and the radar system from FIG. 1.

FIG. 1 illustrates a motor vehicle 10 in the form of a passenger vehicle in front view. The motor vehicle 10 has a radar system 12. The radar system 12 is arranged, for example, in the front bumper of the motor vehicle 10. All components of the radar system 12, for example a plurality of transmitters and receivers, can be contained, for example, combined in a single radar sensor. The radar system 12 can be used to monitor a monitoring region 14, shown in FIG. 2, in the driving direction 16 in front of the motor vehicle 10 for objects 18. The radar system 12 can also be arranged and oriented differently at another location on the motor vehicle 10. The objects 18 can be, for example, other vehicles, persons, obstacles, uneven portions of the roadway, for example potholes or rocks, roadway boundaries or the like. In FIG. 2, an object 18 is indicated, for example, as a chequered rectangle. Otherwise, FIG. 2 is merely a functional diagram of some of the components of the motor vehicle 10 and of the radar system 12, which diagram does not serve for spatial orientation.

The radar system 12 is configured as a frequency-modulated continuous wave radar. Frequency-modulated continuous wave radar systems are also referred to in specialist circles as FMCW (frequency modulated continuous wave) radar systems. The radar 12 can be used, for example, to determine a distance, a direction and a speed of the object 18 relative to the motor vehicle 10.

The radar system 12 is part of a driver assistance system 20 or can at least be connected thereto. For example, the driver assistance system 20 can be used to support a driver of the motor vehicle 10. For example, the motor vehicle 10 can drive and park or exit parking spaces at least partially autonomously using the driver assistance system 20. The driver assistance system 20 can be used to influence driving functions of the motor vehicle 10, for example engine control, a braking function, or a steering function, or to output notices or warning signals. To this end, the driver assistance system 20 is connected in a regulating and/or controlling fashion to function devices 22. FIG. 2 illustrates by way of example two function devices 22. The function devices 22 can be, for example, an engine control system, a brake system, a steering system, a chassis control system or a signal output system.

The driver assistance system 20 includes an electronic control device 24, with which corresponding electronic control and regulation signals can be transmitted to the function devices 22 and/or be received and processed thereby.

The radar system 12 comprises, for example, a first transmitter 26a, a second transmitter 26b, an electronic control and evaluation device 28 and a receiver 30. The transmitters 26a and 26b are implemented, for example, with a radar sensor which contains, for example, a chip with the two integrated transmitters 26a and 26b. The transmitters 26a and 26b are each connected to a separate transmission antenna. For example, the—here three—transmission antennas are arranged at a distance of a few millimetres.

The control and evaluation device 28 has a signal-transmitting connection to the control device 24. The control device 24 can be used to perform open-loop/closed-control of the driving functions of the motor vehicle 10 in accordance with object information of the radar system 12. It is not essential for the invention whether electrical/electronic control and/or evaluation devices, such as for example the control device 24, the control and evaluation device 28, an engine control device of the motor vehicle 10, or the like, are integrated into one or more components or assemblies or realized at least partially as decentralized components or assemblies.

The respective transmission antennas of the transmitters 26a and 26b are, for example, of identical design. The transmitters 26a and 26b can be used to transmit respective transmission signals 32a and 32b, in each case at a constantly changing frequency into the monitoring range 14. The transmission signals 32a and 32b are reflected at the object 18 and sent back as corresponding received signals 34a and 34b to the receiver 30 and received therewith. According to a further method described below, the distance, the direction and the speed of the object 18 relative to the motor vehicle 10 are determined from the received signals 34a and 34b with the control and evaluation device 28.

Alternatively, in an exemplary embodiment which is not shown, the transmitters 26a and 26b and the receiver 30, for example the antennas thereof, can be arranged spatially distant from one another. The transmitters 26a and 26b and the receiver 30, or the respective antennas, can be arranged in a different way, for example at different heights and/or at different distances and/or with a different arrangement and/or at a different location.

The method for determining object information of objects 18 which are sensed with the radar system 12 is explained by way of example below with reference to FIGS. 3 to 9.

In the method, the control and evaluation device 28 is used to actuate the transmitters 26a and 26b in such a way that the first transmission signal 32a is transmitted with the first transmitter 26a, and the second transmission signal 32b is transmitted with the second transmitter 26b, simultaneously into the monitoring range 14. The transmission signals 32a and 32b are generated from, for example, the same frequency-modulated continuous wave signal and are composed of a plurality of what are referred to as chirps, which occur successively. The second transmission signal 32b is also encoded with respect to the first transmission signal 32a by means of phase modulation in the form of binary shift keying, in such a way that a signal orthogonality between the first transmission signal 32a and the second transmission signal 32b is achieved.

Figure 3:
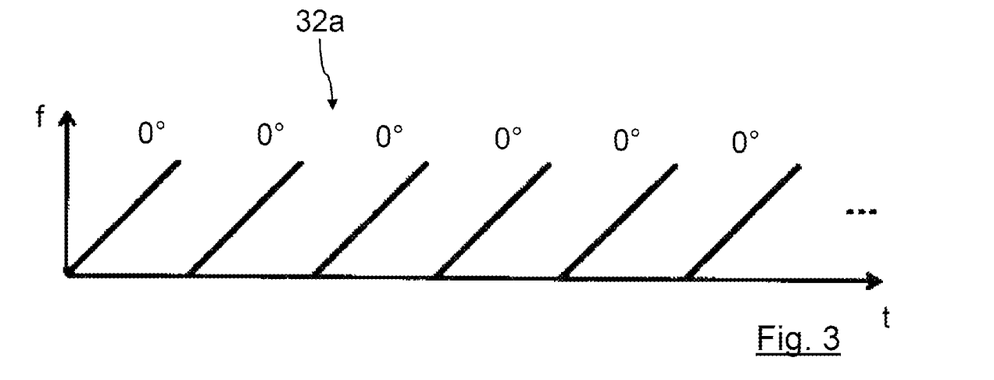
FIG. 3 shows a frequency/time diagram of a first transmission signal of a first transmitter of the radar system from FIGS. 1 and 2.

FIG. 3 shows a frequency/time diagram for the first transmission signal 32a. The frequency f is plotted on the ordinate axis, and the time t on the abscissa axis. The chirps are shown here in each case as frequency ramps. The successive chirps of the first transmission signal 32a each have the same phase position, that is to say each shifted by 0° in respect of their phase. The first transmission signal 32a is therefore emitted with a constant phase. Overall, 128 such chips are emitted, for example, during a measurement. The number of chirps specifies a uniqueness range which is 128 here.

Figure 4:
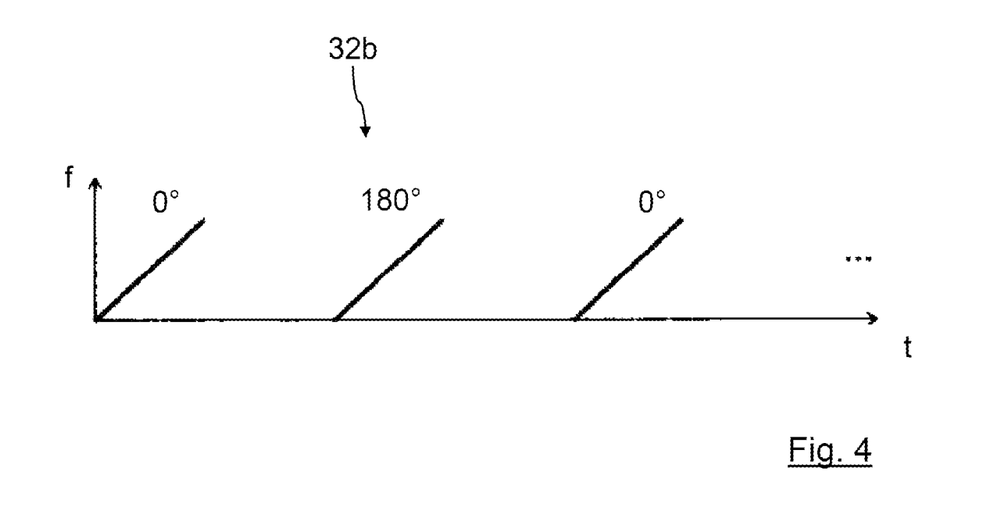
FIG. 4 shows a frequency/time diagram of a second transmission signal of a second transmitter of the radar system from FIGS. 1 and 2.

FIG. 4 shows a frequency/time diagram, comparable with FIG. 3, of the second transmission signal 32b. The second transmission signal 32b is emitted in an analogous fashion to the first transmission signal 32a on the basis of successive chirps, but here with a transmission pause after each emitted chirp. The length of the transmission pause corresponds to the length of a chirp. Moreover, the successive chirps are implemented with a phase change, specifically between 0° and 180°, and therefore with a regularly alternating pattern.

The receiver 30 is used to receive the echoes, reflected at the object 18, of the transmission signals 32a and 32b as received signals 34a and 34b, and converted into a form which can be used by the control/evaluation device 28.

The received signals 34a and 34b are subjected to a two-dimensional fast Fourier transformation with corresponding means of the control/evaluation device 28.

Target signals ZS, corresponding to the transmission signals 32a and 32b, of physically present target objects and their respective complex-valued amplitudes are obtained from the result of the two-dimensional discrete Fourier transformation. A target object is a part of the object 18. A plurality of target objects can originate from the same object 18 or from different objects. One time signal ZS per target object corresponds to the first transmission signal 32a. Owing to the shifting of the phase position and of the transmission pauses of the second transmission signal 32b, two target signals ZS per target object correspond after the Fourier transformation. Therefore, three target signals ZS correspond overall to each target object. In this context, the target signals ZS from the second transmission signal 32b are shifted by half the uniqueness range with respect one another in the Doppler dimension and by ¼ or ¾ of the uniqueness range with respect to the target signal ZS from the first transmission signal 32a. In addition, for the same target object the amplitudes of the target signals ZS from the second transmission signal 32b are identical in respect of absolute value and phase, that is to say the complex values, and are lower in absolute value than the amplitude of the target signal ZS from the first transmission signal 32a, provided that the transmission signals 32a and 32b are emitted with the same power.

Figure 5:
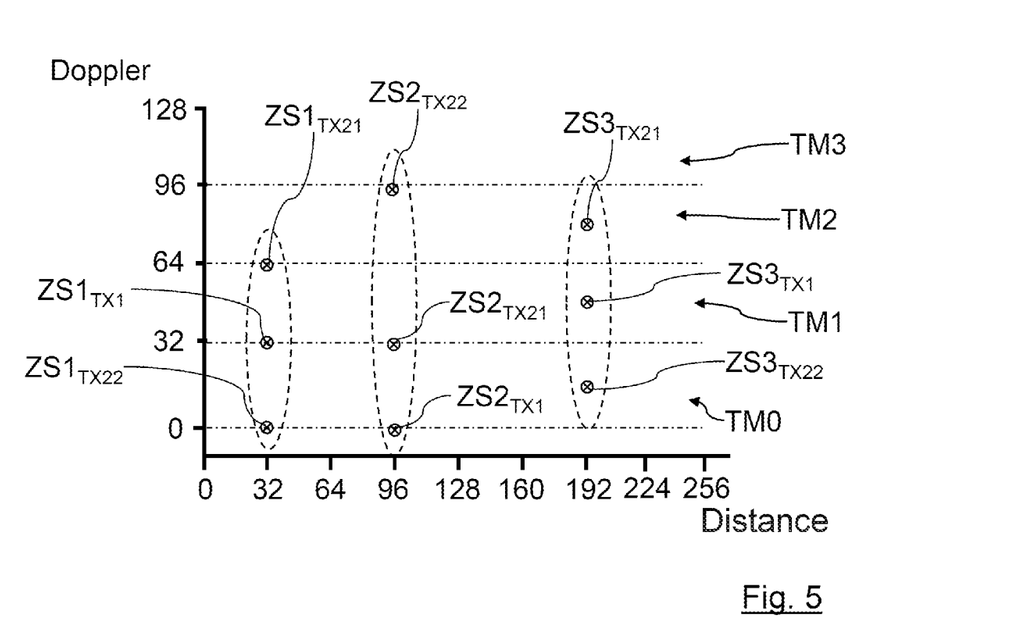
FIG. 5 shows a range Doppler diagram with target signals which have been acquired from received signals of the first transmission signal and of the second transmission signal from FIGS. 3 and 4 which have been reflected at three target objects.

In FIG. 5, for example the target signals ZS are each indicated in a range Doppler matrix with a cross. The range gates correspond here to so-called "range bins" or distance intervals. The range Doppler matrix comprises, for example, 256 range gates. The Doppler gates correspond to what are referred to as relative speed gates or "Doppler bins".

In the present exemplary embodiment, the uniqueness range in the Doppler dimension corresponds to the number of chirps and is 128 Doppler gates, as already mentioned above. The range Doppler matrix therefore comprises, for example, 128 Doppler gates. The range Doppler matrix is composed of cells which characterized by a range value k and a Doppler value l, and has a complex-valued amplitude s(k, l). The absolute value of the amplitude s(k, l) characterizes the intensity of any signal in the cell or, if no signal is received, the noise there.

In the exemplary embodiment shown, the target signals ZS of three target objects are determined In this context, the target signals ZS which are located at the same range gate with the same range value, that is to say at the same distance from the radar system 12, correspond to the same target object.

The assignment of the target signals ZS to the transmission signals 32a and 32b and to the corresponding target objects occurs first in the manner explained below. However, for the sake of better comprehension, the respective designations will already be introduced now. The target signals are designated by "ZS1", "ZS2" and "ZS3", in a corresponding way to the target objects. The target signals ZS which originate from the first transmission signal 32a are additionally characterized by "TX1". The target signals ZS which correspond to the second transmission signal 32b are additionally designated by "TX21" or "TX22", wherein "TX21" corresponds to the first target signal and "TX22" corresponds to the second target signal of the second transmission signal 32b. For example, the target signal which corresponds to the second target object and originates from the first transmission signal 32a has the designation "$ZS2_{TX1}$". Correspondingly, the target signals which correspond to the second target object and originate from the second transmission signal 32b have the designations "$ZS2_{TX21}$" and "$ZS2_{TX22}$".

In FIG. 5, the three target signals ZS which are associated with the same target object are each surrounded with a dotted ellipse to make them easily recognizable. The target signals ZS1 which are associated with the first target object have the same range value, for example 32, and in addition the three target signals ZS1 have the Doppler values 0, 32 and 64. The target signals ZS2 which are associated with the second target object have the same range value, for example 96. In addition, the three target signals ZS2 have the Doppler values 0, 32 and 96. The target signals ZS3 which are associated with the third target object have the same range value, for example 192. In addition, the three target signals ZS3 have the Doppler values 16, 48 and 80.

Figure 6:
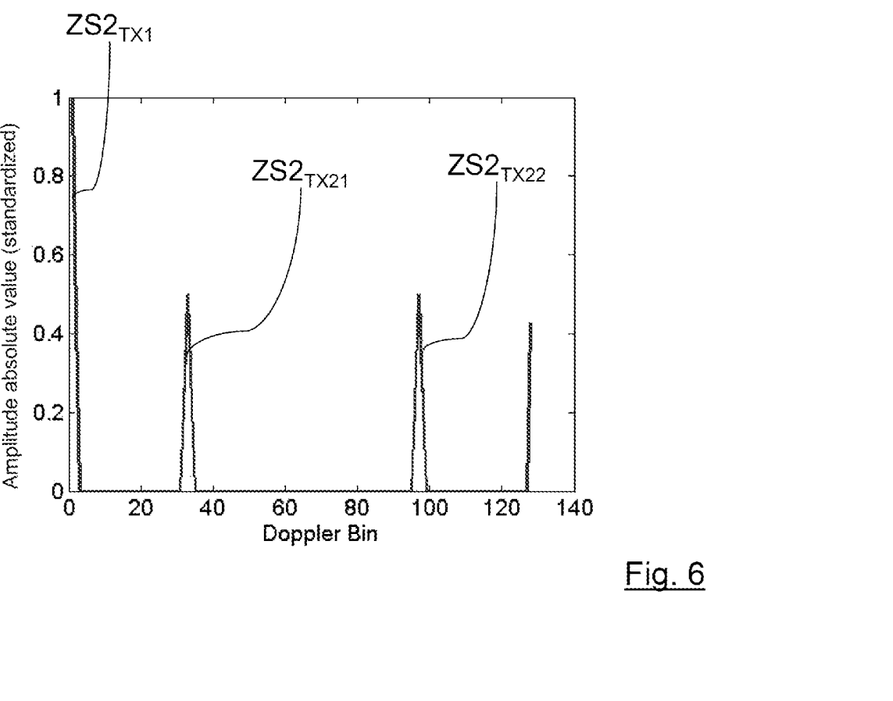
FIG. 6 shows an amplitude absolute-valued Doppler diagram of the target signals from FIG. 5, which are located in the same range gate.

FIG. 6 shows, for example, the target signals $ZS2_{TX1}$, $ZS2_{TX21}$ and $ZS2_{TX22}$, which are associated with the second target object, in an amplitude absolute-value Doppler diagram. For the sake of better comprehension, the absolute value of the amplitude of the strongest target signal $ZS2_{TX1}$ is standardized to 1. For example, the amplitudes can be specified as attenuation. In this case, for example the amplitudes of the target signals $ZS2_{TX21}$ and $ZS2_{TX22}$ from the second transmission signal 32b may be 6 dB smaller than the amplitude of the target signal $ZS2_{TX1}$ from the first transmission signal 32a.

In the text which follows it is explained how the target signals ZS are assigned to the corresponding transmission signals 32a and 32b and validated.

The range Doppler matrix is divided into sub-matrices TM0, TM1, TM2 and TM3 with the same extent in the Doppler dimension. In this context, the number of sub-matrices TM is calculated from the quotient of the number of Doppler gates of the uniqueness range and the smallest possible Doppler interval between target signals ZS originating from the first transmission signal 32a and the second transmission signal 32b, of the same target object. In the case of the exemplary uniqueness range of 128 Doppler gates and a smallest possible Doppler interval of 32 Doppler gates, the range Doppler matrix is divided into four sub-matrices TM0, TM1, TM2 and TM3, each with the extent of 32 Doppler gates.

For each range value k the absolute values of the amplitudes s of the cells of the sub-matrices TM0, TM1, TM2 and TM3 which each correspond in priority with respect to their Doppler value l are combined to form a respective spectrum value $a_{k,lt}$. In other words, the respective cells of the sub-matrices TM0, TM1, TM2 and TM3 with the lowest Doppler value l are combined, those cells with the second-lowest Doppler value l are combined and those cells with the third-lowest Doppler value l are combined etc. In order to determine the spectrum values $a_{k,lt}$, the absolute values of the amplitudes s of the respective cells are advantageously added and the result squared. This is done according to the following formula:

$$a_{k,lt}=(|s_0(k,lt)|+|s_1(k,lt+32)|+|s_2(k,lt+64)|+|s_3(k,lt+96)|)^2$$

Here, "k" is the respective distance value between 0 and 256. "lt" is a running parameter for the Doppler values l. "lt" runs from 0 to 32, that is to say over the extent of a sub-matrix TM in the Doppler dimension. $s_0$ corresponds to the respective complex-valued amplitude in the cell of the lowest sub-matrix TM0 in FIG. 5, extending between the Doppler values 0 and 32. $S_1$ corresponds to the respective complex-valued amplitude in the cell of the second-lowest sub-matrix TM1 in FIG. 5, which extends between the Doppler values 32 and 64. $S_2$ corresponds to the respective complex-valued amplitude in the cell of the third sub-matrix TM2 in FIG. 5, extending between the Doppler values 64 and 96. $S_3$ corresponds to the respective complex-valued amplitude in the cell of the uppermost sub-matrix TM3 in FIG. 5, extending between the Doppler values 96 and 128.

Figure 7:
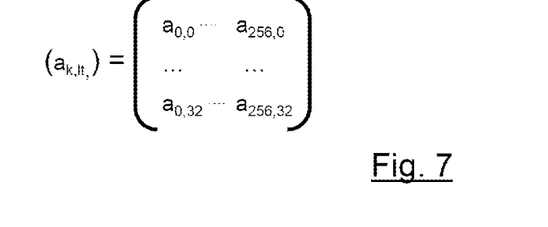
FIG. 7 shows a spectrum matrix which can be acquired from the amplitudes of the cells in accordance with the range Doppler diagram from FIG. 5.

The spectrum values $a_{k,lt}$ obtained thereby can be presented in a 32×256 spectrum matrix $(a_{k,lt})$, as indicated in FIG. 7. In this context, for the sake of better comprehension only four of the spectrum values $a_{k,lt}$ are designated, for example.

Figure 8:
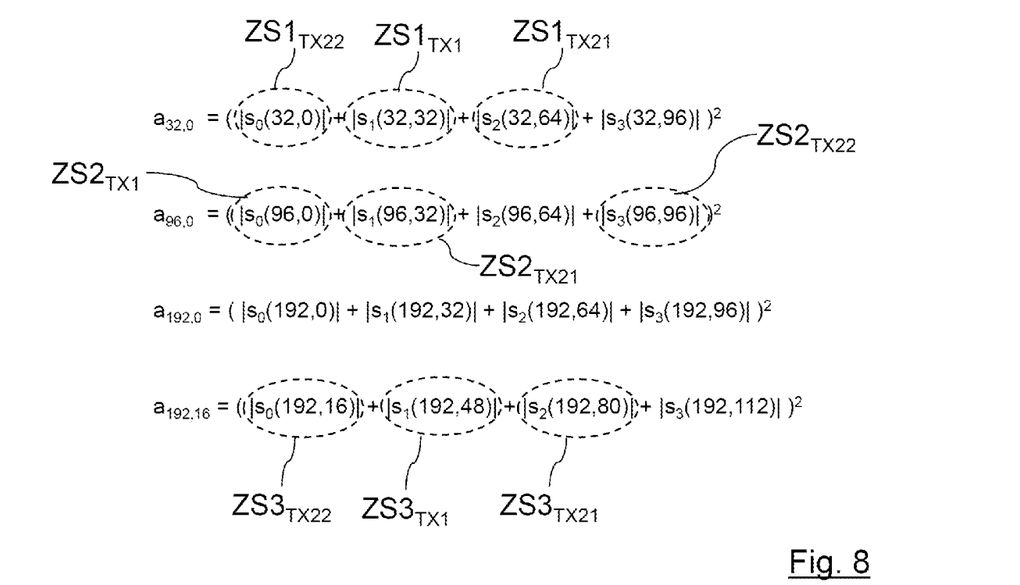
FIG. 8 shows calculations of, for example, four spectrum values of the spectrum matrix from FIG. 7.
Figure 9:
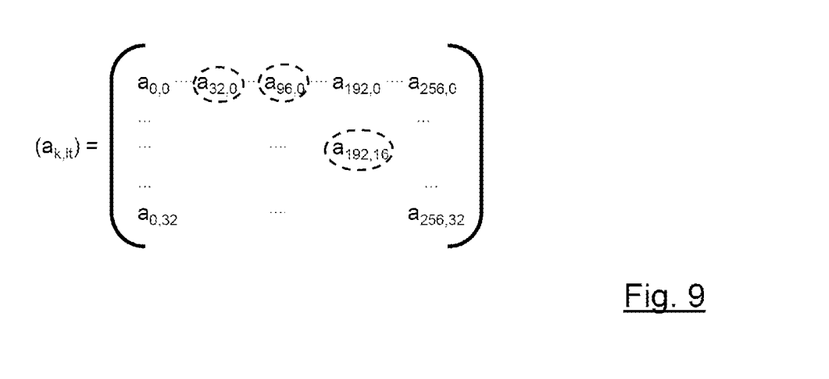
FIG. 9 shows the spectrum matrix from FIG. 7, which contains, for example, the spectrum values from the calculations from FIG. 8.

For example, calculations for four of the spectrum values $a_{k,lt}$ are shown in FIG. 8. Anticipating the result, for the sake of simple explanation the amplitudes s of cells in which target signals ZS are located are surrounded by dotted ellipses and provided with the corresponding designations. The amplitudes s which are not marked by ellipses merely have noise. The corresponding spectrum matrix $(a_{k,lt})$ is illustrated in FIG. 9. In this context, for the sake of better clarity, the spectrum values $a_{k,lt}$ which are calculated by way of example and those which have already been illustrated in FIG. 7 are shown.

From all the spectrum values $a_{k,lt}$, for example those which are above a predefined threshold and are detected as being target spectrum values which are associated with a respective target signal ZS1, ZS2 and ZS3 are determined, for example, with a detection algorithm for determining a constant false alarm rate (CFAR). In the present example, these are the spectrum values $a_{32,0}$, $a_{96,0}$, and $a_{192,16}$, which, for the sake of better comprehension, are designated in the text which follows as target spectrum values $az_{32,0}$, $az_{96,0}$, and $az_{192,16}$.

For each target spectrum value $az_{k,lt}$, the complex-valued amplitudes $s_0(k,lt)$, $s_1(k,lt+32)$, $s_2(k,lt+64)$ and $s_3(k,lt+96)$ of the cells which give rise to this target spectrum value $az_{k,lt}$ and which have the same range value k are combined in pairs according to the following formulas to form respective comparison values $X_0$ and $X_1$.

$$X_0=|s_0-s_2|^2$$

$$X_1=|s_1-s_3|^2$$

Here, a difference is formed between the complex-valued amplitude so of the cell which is associated with the respective target spectrum value az and which has the lowest Doppler value l and the complex-valued amplitude $s_2$ of the cells associated with the target spectrum value az and has the third-lowest Doppler value l. The absolute value of the difference is squared and assigned to a first comparison value $X_0$. In addition, a difference is formed between the complex-valued amplitude $s_1$ of the cell which is associated with the same target spectrum value az and which has the second-lowest Doppler value l and the complex-valued amplitude $s_3$ of the cell which is associated with the target spectrum value az and has the highest Doppler value l. The absolute value of the difference is squared and assigned to a second comparison value $X_1$.

In the text which follows, this is carried out by way of example for the second target object with the range value k=32. In the example, the target spectrum value $az_{96,0}$ with the amplitudes $s_0(96,0)$, $s_1(96,32)$, $s_2(96,64)$ and $s_3(96,96)$ corresponds to the second target object. For example, the following correspond:

$$X_{0,Target2}=|s_0(96,0)-s_2(96,64)|^2$$

$$X_{1,Target2}=|s_1(96,32)-s_3(96,96)|^2$$

In the text which follows, in line with the Doppler amplitude diagram for FIG. 6, for the sake of easier calculation it is assumed, for example, that a cell with a target signal $ZS1_{TX1}$, which originates from the first transmission signal 32a has the standardized amplitude s(k, l)=1. The cells with the target signals $ZS1_{TX21}$ and $ZS1_{TX22}$, which originate from the second transmission signal 32b, have, for example, the standardized amplitude s(k, l)=0.5. The cells without a target signal have, for example, amplitudes of, on average, approximately s(k, l)=0.2. Cells without a target signal generally have noise.

The following amplitudes are obtained for the second target object:

$$s_0(96,0)=1$$

$$s_1(96,32)=0.5$$

$$s_2(96,64)=0.2$$

$$s_3(96,96)=0.5$$

The following is obtained for the comparison values $X_{0,Target2}$ and $X_{1,Target2}$:

$$X_{0,Target2}=|1-0.2|^2=0.8$$

$$X_{1,Target2}=|0.5-0.5|^2=0$$

The comparison values $X_0$ and $X_1$ are compared. The signals which are associated with the cells from whose amplitudes the lower of the two comparison values $X_0$ or $X_1$ is formed are validated as the two target signals $ZS_{TX21}$ and $ZS_{TX22}$ which originate from the second transmission signal 32b for the same target object.

In the example, the lower comparison value is $X_{1,Target2}$. The comparison value $X_{1,Target2}$ was formed from the amplitudes $s_1(96,32)$ and $s_3(96,96)$. Therefore, the signals which are associated with the cells (96, 32) and (96, 96) of the range Doppler matrix are validated as the two target signals $ZS2_{TX21}$ and $ZS2_{TX22}$ of the second target object from the second transmission signal 32b.

Subsequently, the absolute values of the amplitudes $s_0(96,0)$ and $s_2(96,64)$ of the cells (96,0) and (96,64), which are not used to form the lower comparison value $X_{1,Target2}$ are compared. The target signal which is associated with the amplitude which is the largest in absolute value is validated as the target signal for the target object which originates from the first transmission signal 32a. The absolute value of the amplitude $|s_0(96,0)|=1$ is larger than the absolute value of the amplitude $|s_2(96,64)|=0.2$. Therefore, the target signal which is associated with the cell (96,0) with the higher absolute value of the amplitude $s_0(96,0)$ than the target signal $ZS2_{TX1}$ for the second target object which originates from the first transmission signal 32a is validated.

Object information of the second target object, for example a speed, a directional angle and a distance of the target object relative to the radar system 12 are determined from the validated target signals $ZS2_{TX1}$, $ZS2_{TX21}$ and $ZS2_{TX22}$.

Since the first transmission signal 32a is not encoded and is shifted in its phase, the Doppler value l which is associated with the first target signal 38a can be considered to be the correct Doppler value, and the correct relative speed of the second target object can be derived therefrom.

To determine a directional angle, a phase difference D between the validated target signals $ZS2_{TX1}$, $ZS2_{TX21}$ and $ZS2_{TX22}$ is determined. The phase difference D can be determined from the validated target amplitudes $s_{TX1}$, $s_{TX21}$ and $s_{TX22}$, for example by means of the following mathematical operation:

$$D = s_{TX1} * \text{conj}(s_{TX21} + s_{TX22})$$

where D and the amplitudes $s_{TX1}$, $s_{TX21}$ and $s_{TX22}$ are complex numbers and where "conj" stands for "for "complex-conjugate". The phase of the variable D then corresponds to the phase difference between the target signals.

In the selected example, the following mathematical relationship is accordingly obtained:

$$D = s_0(96,0) * \text{conj}(s_1(96,32) + s_3(96,96))$$

The method steps which are explained by way of example on the basis of the second target object are correspondingly carried out for the first target object and third target object. In this way, the corresponding target signals $ZS1_{TX1}$, $ZS1_{TX21}$, $ZS1_{TX22}$ and respectively $ZS3_{TX1}$, $ZS3_{TX21}$, $ZS3_{TX22}$ are also validated for the other target objects, and the corresponding object information determined from said signals.

The entire method is carried out cyclically, with the result that the monitoring range 14 is monitored continuously for objects 18, and correspondingly sensed objects 18 can be tracked.

The invention can also be used with a radar system 12 with more than one receiver 30. When, for example, two receivers are used, a three-dimensional fast Fourier transmission can be carried out instead of a two-dimensional fast Fourier transformation.

The invention claimed is:

1. A method for determining at least one object information item of at least one target object which is sensed with a radar system of a vehicle, the method comprising:
   transmitting transmission signals into a monitoring range of the radar system with at least one transmitter;
   receiving echoes of the transmission signals, which are reflected at the at least one target object, as received signals with at least one receiver; and converting the received signals into a form useable by an electronic control and/or evaluation device;
   wherein the received signals are subjected to at least one multi-dimensional discrete Fourier transformation,
   determining at least one target signal from the result of the at least one Fourier transformation;
   determining at least one object information item from the at least one target signal; and
   generating, at the transmitter end, at least one first transmission signal and at least one second transmission signal from a frequency-modulated continuous wave signal, wherein the at least one second transmission signal is encoded by phase modulation with respect to the at least one first transmission signal, with the result that an at least temporary signal orthogonality between the at least one first transmission signal and the at least one second transmission signal is obtained,
   wherein the at least one first transmission signal is emitted with at least one first transmitter, and the at least one second transmission signal is emitted with at least one second transmitter, simultaneously into the monitoring range of the radar system, wherein the at least one second transmission signal is emitted with regular transmission pauses of a predefined length; and
   wherein for at least one target spectrum value:
     a difference between the complex-valued amplitudes (s(k, l)) of the cells which are associated with this target spectrum value and have the lowest Doppler value (l) and the third-lowest Doppler value (l) is formed, and the absolute value of this difference is squared and assigned to a first comparison value ($X_0$),
     and a difference between the complex-valued amplitudes (s(k, l)) of the cells which are associated with this target spectrum value ($az_{k,lt}$) and have the second-lowest Doppler value (l) and the highest Doppler value (l) is formed, and the absolute value of this difference is squared and assigned to a second comparison value ($X_1$),
     the comparison values ($X_0$, $X_1$) are compared and the signals which are associated with the cells from whose amplitudes (s(k, l)) the lower of the two comparison values ($X_0$, $X_1$) is formed are validated as the two target signals which originate from the at least one second transmission signal, for the same target object,
     the absolute values of the amplitudes (s(k, l)) of the cells which are not used to form the lowest comparison value ($X_0$, $X_1$) are compared, and the signal which is associated with the cell with the largest amplitude (s(k, l)) in absolute terms is validated for the same target object as the target signal which originates from the at least one first transmission signal.

2. The method according to claim 1, wherein at the receiver end a multiplicity of target signals is determined from the result of the at least one multi-dimensional discrete Fourier transformation, wherein one of the target signals for each physically present target object corresponds to the at least one first transmission signal, and two target signals correspond to the at least one second transmission signal.

3. The method according to claim 1, wherein the result of the at least one multi-dimensional Fourier transformation is implemented as a range Doppler matrix for a uniqueness range with respect to a Doppler dimension, wherein the range Doppler matrix is composed of cells which are each characterized by a Doppler value (l) and a range value (k) and have a complex-valued amplitude (s(k, l)) which characterizes a signal intensity, wherein:
   the range Doppler matrix is divided into four sub-matrices (TM) with the same extent with respect to the Doppler dimension,
   for each range value (k) the absolute values of the amplitudes (s(k, l)) of the cells of the sub-matrices (TM) which each correspond in priority with respect to their Doppler value (l) are combined to form a respective spectrum value,
   from the spectrum values those values are determined which are above a predefined threshold and are detected as targets spectrum values which are associated with a respective target signal.

4. The method according to claim 1, wherein at least one object information item is determined from at least one validated target signal.

5. The method according to claim 1, wherein the target spectrum values are determined from the spectrum values by at least one detection algorithm.

6. The method according to claim 1, wherein length of the transmission pauses of the at least one second transmission signal are predefined as a period length or integral multiple of the period length of the at least one first transmission signal.

7. The method according to claim 1, wherein in the course of the determination of at least one object information item a phase difference between at least two validated target signals is determined.

8. The method according to claim 1, wherein at least one multi-dimensional discrete Fourier transformation is executed as a fast Fourier transformation.

9. The method according to claim 1, wherein a regularly alternating pattern is applied to at least one transmission signal.

10. The method according to claim 1, wherein at least one transmission signal with a constant phase and/or at least one transmission signal with a changing phase are/is emitted.

11. The method according to claim 1, wherein a phase change between 0° and 180° is applied to at least one transmission signal after each frequency ramp of the frequency-modulated continuous wave signal.

12. A radar system of a vehicle, for determining at least one object information item of at least one target object, comprising:
- at least one transmitter for transmitting transmission signals into a monitoring range;
- at least one receiver for receiving echoes, which are reflected at the at least one target object, of the transmission signals as received signals; and
- at least one control and/or evaluation device comprising means for determining at least one target signal from at least one multi-dimensional discrete Fourier transformation of the received signals and for determining at least one object information item from at least one target signal wherein the at least one control and/or evaluation unit further comprises means for carrying out the method according to claim 1.

13. A driver assistance system of a vehicle, comprising
- at least one electronic control device for controlling functional devices of the vehicle on the basis of object information which is made available by at least one radar system; and
- at least one radar system for determining at least one object information item of at least one target object, wherein the at least one radar system has
  - at least one transmitter for transmitting transmission signals into a monitoring range,
  - at least one receiver for receiving echoes, which are reflected at the at least one target object, of the transmission signals as received signals, and
  - at least one control and/or evaluation device comprising means for determining at least one target signal from at least one multi-dimensional discrete Fourier transformation of the received signals and for determining at least one object information item from at least one target signal, wherein the at least one control and/or evaluation unit has means for carrying out the method according to claim 1.

* * * * *